United States Patent
Cho et al.

(10) Patent No.: US 9,183,958 B2
(45) Date of Patent: Nov. 10, 2015

(54) VITRIFICATION PROCESS METHOD OF ALUMINUM AND FILTER RADIOACTIVE WASTES

(71) Applicant: KOREA HYDRO & NUCLEAR POWER CO., LTD., Gyeongsangbuk-do (KR)

(72) Inventors: Hyun Je Cho, Daejeon (KR); Young Il Kim, Daejeon (KR); Hyun Jun Jo, Daejeon (KR); Cheon Woo Kim, Daejeon (KR)

(73) Assignee: Korea Hydro & Nuclear Power Co., Ltd., Gyeongsangbuk-do (KR)

( * ) Notice: Subject to any disclaimer, the term of this patent is extended or adjusted under 35 U.S.C. 154(b) by 459 days.

(21) Appl. No.: 14/072,193

(22) Filed: Nov. 5, 2013

(65) Prior Publication Data

US 2015/0126795 A1    May 7, 2015

(51) Int. Cl.
*A62D 3/33* (2007.01)
*G21F 9/30* (2006.01)
*C03C 1/00* (2006.01)

(52) U.S. Cl.
CPC .. *G21F 9/305* (2013.01); *C03C 1/00* (2013.01)

(58) Field of Classification Search
CPC ............. A62D 3/33; G21F 9/00; G21F 9/16
USPC ..................... 588/11, 12, 412, 315
See application file for complete search history.

(56) References Cited

U.S. PATENT DOCUMENTS 5,662,579 A * 9/1997 Bickford .................. 588/256

* cited by examiner

*Primary Examiner* — Edward Johnson
(74) *Attorney, Agent, or Firm* — Rabin & Berdo, P.C.

(57) ABSTRACT

Provided is a vitrification process method of aluminum and filter radioactive wastes to produce high quality of glass solidification fit for legislations and rules as vitrification final product, comprising developing frit composition needed in vitrifying the aluminum and filter radioactive wastes, suitably mixing the aluminum and filter radioactive wastes with the frit and producing glass solidification having composition range of oxides of aluminum and filter radioactive wastes to maintain lower than 100 poise viscosity which is operating parameter of a melting furnace. The vitrification process method of aluminum and filter radioactive wastes comprise mixing the aluminum and filter radioactive wastes with the frit in an induction heating low temperature melting furnace and meting it at the temperature of 1,100~1,200° C. to produce glass solidification.

5 Claims, 1 Drawing Sheet

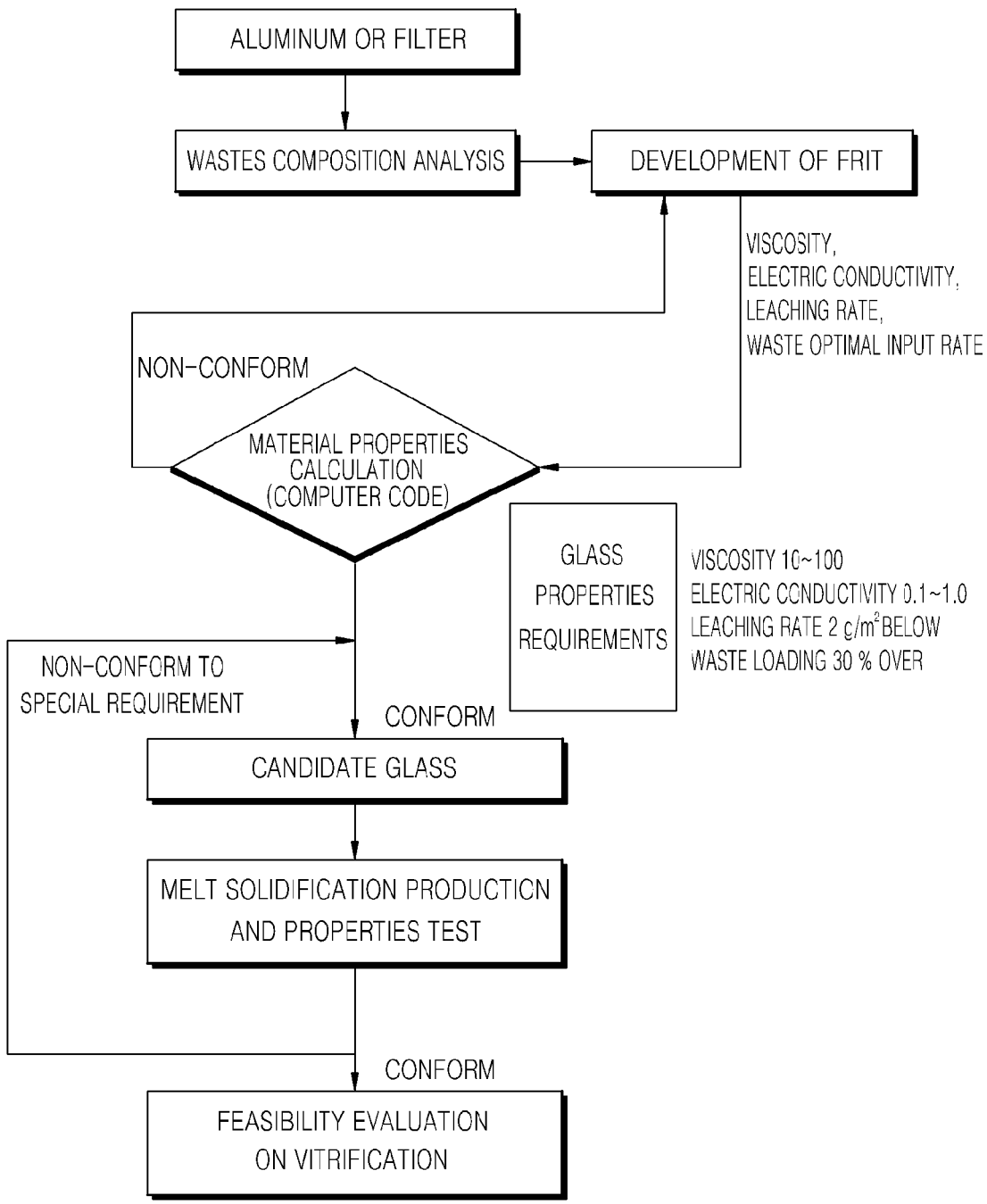

VITRIFICATION PROCESS METHOD OF ALUMINUM AND FILTER RADIOACTIVE WASTES

TECHNICAL FIELD

The present invention relates to the vitrification process method of aluminum and filter radioactive wastes and more specifically to the vitrification process method of aluminum and filter radioactive wastes produced after disposal of contaminants or pollutants in HVAC (Heating, Venting & Air Conditioning System) of nuclear power plants and nuclear reactor facilities, which comprises developing frit composition needed in vitrifying aluminum and filter radioactive wastes using CCIM (Cold Crucible Induction Melter), deriving inputs of aluminum and filter radioactive wastes to be mixed with the frit to maintain appropriate viscosity of the melt thereof, and deriving a composition range of oxides of aluminum and filter radioactive wastes produced therefrom, to prevent the release of aluminum and filter radioactive wastes and to confine pollutants into glass structure.

BACKGROUND ART

Generally, low and intermediate level radioactive waste generated in the nuclear power plants and nuclear reactor facilities includes spent filter radioactive wastes produced in HVAC.

This spent filter radioactive wastes include stainless steel or aluminum material of frame, and filter of which contents have glass fiber and/or aluminum foil as filter media.

To dispose the spent filter radioactive wastes, after the metal frame and filter contents are separated, the metal frame is subject to decontamination and post-treatment, and glass fiber and aluminum foil may be pressed for drum-packaging. However, the drum-packaging disposal have been decided as inappropriate because there is a possibility of explosion on packaging and concern of generation of hydrogen gas (Al+ 2NaOH→½$Al_2O_3$+$Na_2O$+$H_2$) in the disposal site after packaging. Thus stable disposal method for them is needed.

DISCLOSURE

Technical Problem

The present invention is devised to solve the problems described above and provide the vitrification process method of aluminum and filter radioactive wastes to produce high quality of glass solidification fit for legislations and rules as vitrification final product, comprising developing frit composition needed in vitrifying the aluminum and filter radioactive wastes, suitably mixing the aluminum and filter radioactive wastes with the frit and producing glass solidification having composition range of oxides of aluminum and filter radioactive wastes to maintain lower than 100 poise viscosity which is operating parameter of a melting furnace.

Technical Solution

To achieve the object of the invention, the vitrification process method of aluminum and filter radioactive wastes comprise mixing the aluminum and filter radioactive wastes with the frit in an induction heating low temperature melting furnace and meting it at the temperature of 1,100~1,200° C. to produce glass solidification.

Advantageous Effects

As described above, the vitrification process method of aluminum and filter radioactive wastes according to this invention has the effects as follows:

First, the present invention has the advantages of stably confining into glass structure the aluminum and radioactive materials contained in the aluminum and filter radioactive wastes, which are generated after the filter having aluminum foil and glass fiber disposes contaminants or pollutants in HVAC. Specifically the final glass solidification can not only reduce the volume of the wastes but also satisfy the acceptance criteria of disposal site for domestic low and intermediate level radioactive wastes.

Second, since the present invention have simplified the method of applying waste input rate by using the development of frit for vitrification of the aluminum and filter radioactive wastes generated in the nuclear power plants and nuclear reactor facilities and mixing the wastes with the frit, it become possible to develop appropriate glass composition according to the changes in physical and chemical properties to maintain viscosity suitable for keeping operation integrity of CCIM, and to produce high quality of glass solidification fit for legislations and rules as vitrification final product.

DESCRIPTION OF DRAWINGS

FIG. 1 is a process chart to show the vitrification process method of aluminum and filter radioactive wastes according to this invention.

BEST MODE

Hereinafter, the present invention will now be described in detail with reference to the drawing.

FIG. 1 is a process chart to show the vitrification process method of aluminum and filter radioactive wastes according to this invention.

As showed in the drawing, the vitrification process method of aluminum and filter radioactive wastes according to this invention provides mixing the aluminum and filter radioactive wastes with frit, melting at the temperature of 1,100~1,200° C. and vitrifying to produce glass solidification, in the induction heating low temperature melting furnace.

Also, the said frit comprises 1~12wt % of $LiO_2$, 35~65wt % of $B_2O_3$, 8~45wt % of $Na_2O$, 1~5wt % of MgO and 2~20wt % of $SiO_2$, and 0~1wt % of $K_2O$ and 0~1wt % of CaO may be further added to the 100wt % of the said frit.

And the glass solidification comprises 2~8wt % of $LiO_2$, 13~38wt % of $B_2O_3$, 7~17wt % of $Na_2O$, 0.1~10wt % of MgO, 10~37wt % of $Al_2O_3$ and 15~60wt % of $SiO_2$, and 0.1~10wt % of $K_2O$, 0.1~10wt % of CaO, 0.1~5wt % of $TiO_2$, 0.1~15wt % of $Fe_2O_3$ and 0.1~5wt % of ZnO may be further added to the 100wt % of the said glass solidification.

Thus, the vitrification process method of aluminum and filter radioactive wastes according to this invention provide developing the frit to keep the aluminum and filter radioactive wastes into the optimal melting status at the temperature of 1,100~1,200° C. in the induction heating low temperature melting furnace and to keep the melt of the aluminum and filter radioactive wastes into low viscosity (100 poise below) for the integrity of the melting furnace and easiness of pouring. Also the vitrification process method comprises the composition range of the aluminum and filter radioactive wastes to keep the aluminum and filter radioactive wastes with the frit (glass composition) into appropriate melting viscosity status in the induction heating low temperature melting furnace.

Especially, the vitrification process method of aluminum and filter radioactive wastes according to this invention to vitrify the aluminum and filter radioactive wastes in the induction heating low temperature melting furnace, comprises the distribution range of frit oxides to melt and vitrify the aluminum and filter radioactive wastes at the temperature of 1,100~1,200° C., the melting viscosity range of 10~100 poise or so which is the operating range of the melting furnace for final glass solidification produced by vitrification of the aluminum and filter radioactive wastes, the leaching range of the solidification for Si, B, Na, Li etc., and the optimal inputs range for vitrification of the aluminum and filter radioactive wastes.

On the other hand, Table 1 shows the distribution of oxides of glass composition developed for the vitrification process of the aluminum and filter radioactive wastes according to this invention.

TABLE 1

The distribution of oxides of glass composition of the aluminum and filter radioactive wastes

| Oxides | Frit (%) |
|---|---|
| $LiO_2$ | 1~12 |
| $B_2O_3$ | 35~65 |
| $Na_2O$ | 8~45 |
| MgO | 1~5 |
| $SiO_2$ | 2~20 |
| $K_2O$ | 0~1 |
| CaO | 0~1 |

Further, Table 2 shows the distribution of oxides of glass solidification developed for the vitrification process of the aluminum and filter radioactive wastes according to this invention.

TABLE 2

The distribution of oxides of glass solidification of the aluminum and filter radioactive wastes

| Oxides | Glass solidification (wt %) |
|---|---|
| $LiO_2$ | 2~8 |
| $B_2O_3$ | 26~38 |
| $Na_2O$ | 7~17 |
| MgO | 0.1~10 |
| $Al_2O_3$ | 20~37 |
| $SiO_2$ | 15~60 |
| $K_2O$ | 0.1~10 |
| CaO | 0.1~10 |
| $TiO_2$ | 0.1~5 |
| $Fe_2O_3$ | 0.1~15 |
| ZnO | 0.1~5 |

Hereinafter, desirable embodiment of the present invention will now be described in detail.

EMBODIMENT

The vitrification process method of aluminum and filter radioactive wastes

Main physical and chemical properties criteria needed for final glass solidification after melting object material for vitrification are listed in Table 3.

Off-gas wastes filter is a fly ash filter collecting most of off-gas of which elements consists of 10~15wt % of Al, 28~35wt % of Si, 52~57wt % of 0, small amount of 1wt % or so of K, and 1~4wt % of Ca.

The distribution of frit of the fly ash filter consists of 60~70wt % of $SiO_2$, 20~30wt % of $Al_2O_3$, 0~6wt % of CaO.

Optimal wastes input amount and viscosity degree to keep the integrity for the melt using appropriate mixing ratios of the frit and the spent filter are derived and Table 4 shows properties for final glass solidification.

TABLE 3

Main physical and chemical properties criteria needed for glass solidification

| Main properties | Requirements | note |
|---|---|---|
| viscosity | 10~100 poise | process parameter |
| electric conductivity | 0.1~1.0 S/m | |
| chemical strength (PCT) | <2 g/m² | quality of product |
| phase stability | homogeneous | |
| waste loading amount | >30 wt % | economics |

TABLE 4

Properties for glass solidification of filter vitrification

| Material properties/leaching rate | | Filter glass solodification |
|---|---|---|
| material properties | Viscosity (poise) | 20~30 |
| | Electric conductivity (S/m) | 85~90 |
| | Density (g/cm³) | 2.6~2.8 |
| | Basicity | 0.45~0.55 |
| 7-day PCT leaching rate (g/m²) | pH | 11~12 |
| | B | 0.5~1.0 |
| | Li | 0.5~1.0 |
| | Na | 0.5~1.0 |
| | Si | 0.2~0.4 |

What is claimed is:

1. A vitrification process method of aluminum and filter radioactive wastes, comprising steps of mixing aluminum and filter radioactive wastes with frit, melting the mixture at the temperature of 1,100~1,200° C., and producing glass solidification therefrom.

2. The vitrification process method of aluminum and filter radioactive wastes of claim 1, wherein the frit comprises 1~12wt % of $LiO_2$, 35~65wt % of $B_2O_3$, 8~45wt % of $Na_2O$, 1~5wt % of MgO and 2~20wt % of $SiO_2$.

3. The vitrification process method of aluminum and filter radioactive wastes of claim 2, wherein the frit further comprises 0~1wt % of $K_2O$ and 0~1wt % of CaO.

4. The vitrification process method of aluminum and filter radioactive wastes of claim 1, wherein the glass solidification comprises 2~8wt % of $LiO_2$, 13~38wt % of $B_2O_3$, 7~17wt % of $Na_2O$, 0.1~10wt % of MgO, 10~37wt % of $Al_2O_3$ and 15~60wt % of $SiO_2$.

5. The vitrification process method of aluminum and filter radioactive wastes of claim 4, wherein the glass solidification further comprises 0.1~10wt % of $K_2O$, 0.1~10wt % of CaO, 0.1~5wt % of $TiO_2$, 0.1~15wt % of $Fe_2O_3$ and 0.1~5wt % of ZnO.

* * * * *